UNITED STATES PATENT OFFICE 2,360,519

CEMENT COMPOSITION AND METHOD OF MAKING THE SAME

Edward W. Scripture, Jr., Shaker Heights, Ohio

No Drawing. Application August 14, 1941,
Serial No. 406,906

6 Claims. (Cl. 106—90)

This application is a continuation-in-part of my copending application Serial No. 299,696, filed October 16, 1939, now Patent No. 2,264,336, and the invention relates to a process and composition for grinding cements. It particularly relates to a method of grinding cements wherein the speed of grinding may be increased with existing equipment.

Hydraulic cements are manufactured by mixing together in a finely divided state, in suitable proportions, either by a wet process or a dry process, suitable raw materials, usually of a calcareous and a silicious nature, to produce after the manufacturing operation chemical compounds having hydraulic and cementitious properties in the desired proportions. The mixed raw materials are heated together in a kiln, in modern practice usually a rotary kiln, and burned at a temperature which causes sintering, or in some cases they may be burned to actual fusion. After burning the resultant product, usually called "clinker," is allowed to cool. In this stage of manufacture the cementitious compounds have been formed but exist in a physical state, that of relatively large pieces with very low surface area, in which they cannot be used to make mortar or concrete mixes. This cement clinker is then reduced by grinding, usually in a ball mill of either the intermittent or continuous type, to a relatively fine state of subdivision having a relatively large surface area. During this stage, calcium sulphate in one form or another is usually added to the cement to prevent too rapid set.

The hydraulic properties of the cement depend on its chemical composition and on the burning operation, but also to a considerable extent on the grinding and the degree of fineness to which it has been reduced. For example, the plastic properties and the rate at which the cement hydrates are markedly affected by the surface area, that is, the degree of grinding.

The grinding of cement clinker requires the use of considerable equipment and consumes a substantial period of time. In order to operate the equipment, power in one form or another is required. The grinding operation, therefore, adds substantially to the cost of manufacture of cement and it will be obvious that the finer the grinding the greater will be this cost.

It has heretofore been known that certain materials when added to cement clinker in the mill will facilitate grinding and will increase the efficiency of this operation. In order to be useful, such materials must not have an adverse effect on the plastic or hydraulic properties of the cement, as by retarding or preventing hydration. It is preferable that such materials, which may be termed "grinding aids," shall improve the properties of the cement and of the mortar or concrete in which they are used with respect to strength, rate of hardening, plasticity, durability, or other properties.

It is an object of this invention to provide a method of producing finely ground cement, wherein the cost of grinding the cement clinker is reduced.

It is a further object of this invention to provide a method for grinding cements, wherein the time required to reduce cement clinker to a given surface area is reduced.

It is a further object of this invention to provide a method wherein the finer grinding of cement clinker and the production of a cement of greater surface area are facilitated.

It is a further object of this invention to provide a ground cement clinker which shall have improved plastic and hydraulic properties.

In my copending application, Serial No. 406,904 of even date herewith, I disclosed that these objects are accomplished by incorporating with the cement clinker in the grinding mill a relatively small percentage, based on the weight, of a compound having the general formula:

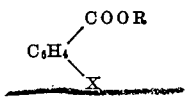

where R is a member of the group consisting of metals, ammonium, organic radicals and hydrogen, and X is a member of the group consisting of functional groups, derivatives thereof, and non-functional groups.

In accordance with the present invention, it has been found that a further improvement in grinding time and a further improvement in the properties of the cement are obtained by incorporating in the grinding mill with the cement clinker both a small amount of a cement dispersing agent and a small amount of one or more compounds of the above general formula. While each of these ingredients is effective in lowering the grinding time and improving the properties of structures produced from mixes containing the ground cement, both ingredients coact to produce a greater improvement than that obtainable with an equal total quantity of either ingredient.

Cement dispersing agents are defined herein, as in the Tucker Patent No. 2,141,569, and include those agents which when added to cement render the cement particles mutually repellant. They are thus distinguished from the class of reagents known as "wetting" agents, which do not render the particles mutually repellant but are characterized substantially entirely by the property of lowering the surface tension of water.

Cement dispersing agents include waste sulphite liquor, saponin, etc., as well as the compounds disclosed in Patent No. 2,141,569, examples of which are aromatic sulphonic acids, derivatives thereof, such as naphthalene sulphonic acid derivatives, their homologues, etc.

The preferred compounds of the above general formula are solids and of these the salicylates and derivatives thereof appear to be particularly effective. Examples of these are:

(a) The metal salicylates, including salicylates of the alkali metals, the alkaline earth metals, mercury, bismuth and others.

Examples of other compounds which contain the salicylate grouping and which are effective are:

(b) Salicylic acid, acetylsalicylic acid, sulphosalicylic acid and caffeine-salicylic acid.

Other very effective compounds are the substituted benzoic acids and derivatives thereof. Examples of these are:

(c) Hydroxy benzoic acids, nitro-benzoic acids, amino benzoic acids, methyl amino benzoic acids, such as methyl salicylate and benzene dicarboxylic acids, such as phthalic acid, etc.

It may be noted that the substituted groups may be in positions ortho, meta or para to the carbonyl. Other groups may also be substituted in the benzene nucleus without harming the effectiveness of the compounds. Thus sulphosalicylic acid, which is a sulphonated salicylic acid, is a very effective material.

It has been observed that in the grinding of cement clinker the balls, in a ball mill, and the walls of the mill tend to become coated with the more or less finely ground cement. This formation on the grinding surfaces apparently exerts a cushioning effect, such that the rate of grinding is thereby greatly diminished.

I have found that when small amounts of a cement dispersing agent and of the compounds of the above general formula are added to the cement clinker in a ball mill, the formation of a cushion on the grinding surfaces appears to be reduced and the efficiency of the grinding operation is increased. The saving in grinding time depends to a large extent both on the quantity of the above described compounds, which are present in cement, and on the degree of fineness desired in the cement. With an increase of the salicylic acid or equivalent material from effective amounts, such as .005%, there is an increased efficiency in grinding until about .05% or .1% on the weight of the cement is present. Although as much as .5% salicylic acid or equivalent compound of the above general formula may be incorporated with the cement clinker, appreciable further improvement in results does not appear to be obtained. When the cement is ground to a greater surface area, the reduction in the time required to reach this surface area by means of the present invention is substantially increased.

Waste sulphite liquor is especially desirable as a cement dispersing agent and like other dispersing agents it should be present in amounts less than .5%, and, preferably less than .3%, of the weight of the cement; more than .5% adversely affects the strength of the cement. As little as .005% or .01% on the weight of the cement of a cement dispersing agent in combination with a salicylate compound, or with other substituted benzoic acid or derivative thereof having the above general formula, produces noticeable improvements in grinding efficiency and in the strength of a suitable hardened cement mix. The total amount of the salicylate compound and of the active cement dispersing agent present should preferably be less than .5% of the weight of the cement.

The utilization of both a cement dispersing agent and a compound of the above general formula is also advantageous in that a larger total quantity of grinding aid may be present in the cement, and maximum decrease in grinding time may be had, together with substantially maximum improvement in the strength of the mixes containing the cement thus produced.

The following examples illustrate the present invention:

*Example 1*

.05% of salicylic acid and 0.15% of dried residue of waste sulphite liquor were added to cement clinker and ground for two hours; the same amount of the same batch of cement clinker was ground for two hours, without the salicylic acid and waste sulphite liquor. The surface areas of the resulting cements were compared by means of a Klein turbidimeter. The customary proportion of gypsum was used in both cases. The surface area of the cement ground without addition of the salicylic acid and cement dispersing agent was found to be 1660 sq. cm./gram, that of the cement ground with salicylic acid was 1920 sq. cm./gram. With smaller proportions of salicylic acid and cement dispersing agent, similar results were secured; but, the increases in surface area were somewhat less. With larger proportions of salicylic acid, similar results were also secured; but, in this case the increases in surface area secured were slightly greater.

This is not the entire benefit to be derived from the use of a composition which comprises both a compound of the type of salicylic acid and a compound of the type of dried waste sulphite liquor. Such a composition also imparts desirable characteristics to the concrete or mortar made from such cements. In the first place, the amount of water required to produce a given consistency or workability in a given concrete mix is substantially reduced. Second, the compressive strengths secured at any age are increased. Third, the surface area of cement available for hydration is greatly increased by the action of the cement dispersting agent. Fourth, the durability of the concrete is improved. Fifth, the tendency of the concrete to bleed, that is, for the water to separate from the cement, is reduced.

*Example 2*

To illustrate the effects of this composition on the properties of concrete, tests were made according to standard procedures. Concrete mixes in the proportion of 447 lbs. cement, 1340 lbs. sand, and 1985 lbs. ¾" stone were made up with sufficient water to give approximately equal consistencies in all mixes. Cylindrical specimens, 6" x 12", were prepared and determinations made of the compressive strengths at various ages. The results of two such series of tests on cements ground to the same surface area with and without the composition were as follows:

| | Surface area, sq. cm. per g. | Water, gals./ sack | Slump, in. | Compressive strength, lbs. per sq. in. | | | |
|---|---|---|---|---|---|---|---|
| | | | | 1 day | 3 days | 7 days | 28 days |
| Cement [1] | 1,660 | 7.45 | 2¾ | 870 | 2,020 | 2,775 | 3,810 |
| Do.[2] | 1,665 | 6.40 | 2¼ | 920 | 2,970 | 4,370 | 4,930 |
| Do.[1] | 2,110 | 7.60 | 2 | 950 | 2,375 | 3,110 | 3,985 |
| Do.[2] | 2,115 | 6.85 | 2½ | 1,080 | 3,070 | 4,500 | 4,770 |

Composition: .05% salicylic acid; .30% waste sulphite liquor.
[1] Cement ground without addition.
[2] Cement ground with .05% salicylic acid and .3% waste sulphite liquor.

While in the example which I have given I have used .05% salicylic acid on the weight of the cement and .3% dried waste sulphite liquor, other proportions may equally well be used depending on the results desired. With a smaller proportion of salicylic acid or compound of the same type, the improved grinding efficiency will be less and with larger proportions slightly greater.

Grinding is also improved by the use of larger proportions of waste sulphite liquor or similar material. Also the greater proportion of waste sulphite liquor produced a greater reduction in water required in a given concrete mix for a given consistency and greater increase in strength.

Whereas I have found that if waste sulphite liquor or similar material is added to the cement after grinding in considerable proportions, such as proportions substantially in excess of .15% of the weight of the cement, the strength of the concrete or mortar is more or less seriously impaired, especially at the early ages, and it became necessary or desirable to use in addition an accelerating agent, I find that when such materials are added before grinding or are ground with the clinker, these deleterious effects are not observed with the larger proportions.

It will be seen from the above that an outstanding improvement in the strength of the cement is obtained by the practice of the present invention. By grinding one or more of the above described compounds with the cement, they are more uniformly dispersed in the cement and are forced into intimate contact and even into the pores of the individual particles of cement, so that in most instances superior results are obtained.

While I have chosen to illustrate the present invention by compositions containing salicylic acid and waste sulphite liquor, which are very effective, it is understood that similar effects in increasing grinding efficiency are secured with the addition of small amounts of compounds having a constitution similar to that of salicylic acid, such as zinc salicylates and other compounds containing the salicylate groups or included by the above general formula, together with any cement dispersing agent. The above designated substituted benzoic acids or derivatives thereof may be used in place of salicylic acid in the above examples with substantially equivalent results. Similarly, other cement dispersing agents, such, for example, as those listed above, may be used in place of the waste sulphite liquor if desired. Waste sulphite liquor and salicylic acid form a particularly effective low cost combination, however.

It will be apparent that the compounds which facilitate grinding, such as the cement dispersing agent and salicylic acid or a compound of similar constitution, may be added to the cement clinker as a dry powder or in solution, or in other physical form. It will also be apparent that more or less than the usual amount of gypsum or other form of calcium sulphate may be added, depending on the desired characteristics of the cement, and that other substances may be added to the cement at the same time or subsequently.

What I claim is:

1. In a process of grinding hydraulic cement clinker, the step which comprises grinding the hydraulic cement clinker in the presence of a small amount of a cement dispersing agent and a small amount of a compound selected from the group consisting of substituted benzoic acids, salts and esters thereof.

2. In a process of grinding hydraulic cement, the step which comprises adding to the hydraulic cement clinker a small amount of a cement dispersing agent and a small amount of a compound containing the salicylate group.

3. In a process of grinding hydraulic cement, the step which comprises adding to the hydraulic cement clinker a small amount of a salicylate and a cement dispersing agent.

4. In a process of grinding hydraulic cement, the step which comprises adding to the hydraulic cement clinker a small amount of salicylic acid and active constituents of waste sulphite liquor.

5. In a process of grinding hydraulic cement, the step which comprises grinding the hydraulic cement clinker with a small amount of the active ingredients of waste sulphite liquor and a small amount of a member of the group consisting of substituted benzoic acids, salts and esters thereof.

6. In a process of grinding hydraulic cement, the step which comprises grinding the hydraulic cement clinker with a small amount of a cement dispersing agent and a small amount of a monosubstituted benzoic acid.

EDWARD W. SCRIPTURE, Jr.